Sept. 30, 1930.  T. M. BRUBACK ET AL  1,777,115
MOTOR OPERATED VALVE
Filed June 29, 1927      2 Sheets-Sheet 1

INVENTORS:
Theodore M. Bruback
and De Los E. Hibner, jr.
By Attorneys,
Fraser, Myers & Manley

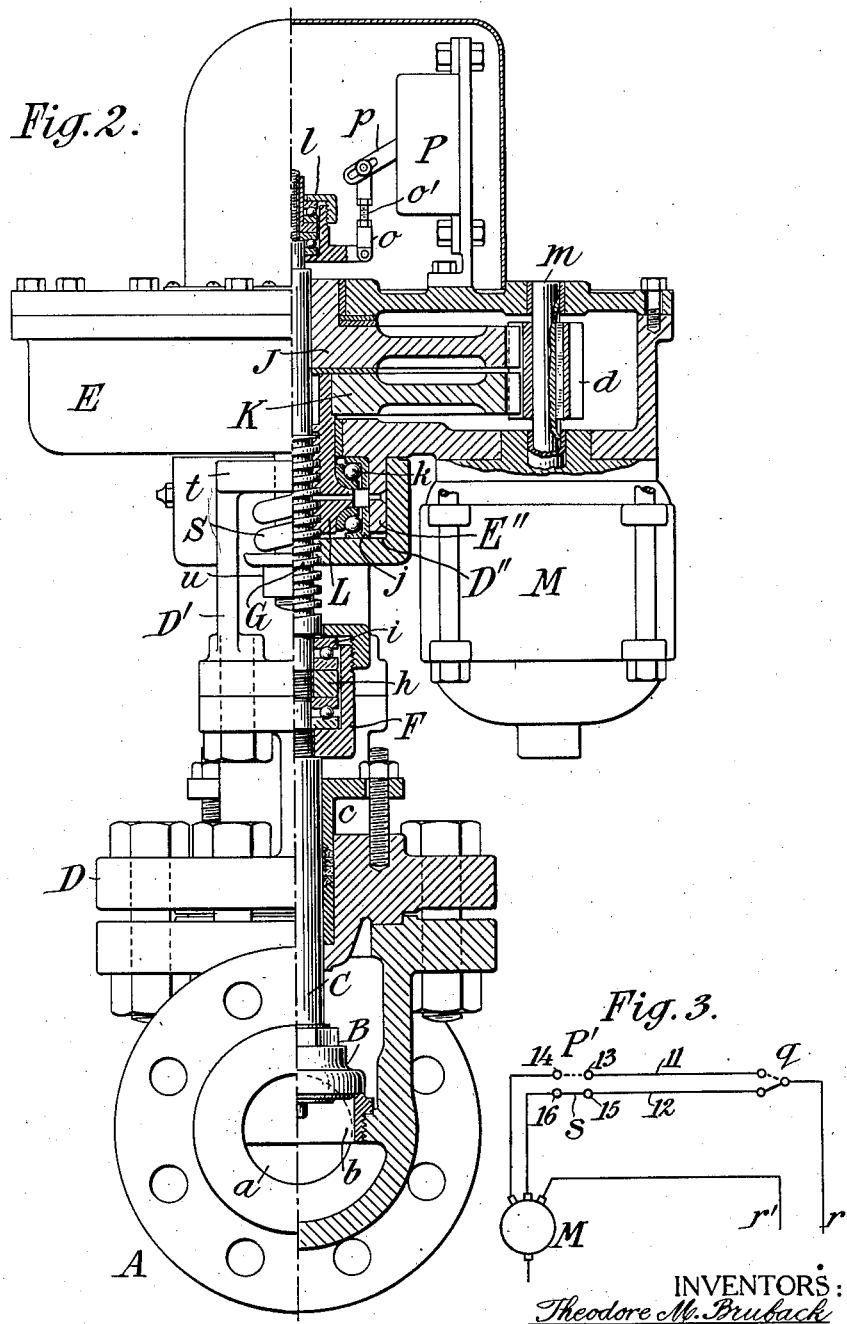

Patented Sept. 30, 1930

1,777,115

UNITED STATES PATENT OFFICE

THEODORE M. BRUBACK AND DE LOS E. HIBNER, JR., OF DU BOIS, PENNSYLVANIA

MOTOR-OPERATED VALVE

Application filed June 29, 1927. Serial No. 202,370.

This invention relates to valves for controlling flow of fluids, of the type wherein the valve is open or closed by an electric motor.

According to the present invention, the requisite gearing down from a high speed motor to the low speed at which the valve should be operated, is effected through differential gearing. The valve is provided with an automatically-operated switch for closing the circuit at the end of the operation of the valve, and at the same time reversing the current so as to prepare for the next contrary operation.

The preferred embodiment of the invention is illustrated in the accompanying drawings, wherein,—

Fig. 2 is a half elevation and half vertical mid-section cut in a plane at right angles to the plane of Fig. 1.

Fig. 3 is a circuit diagram illustrating the switch and motor connections.

Figure 1:
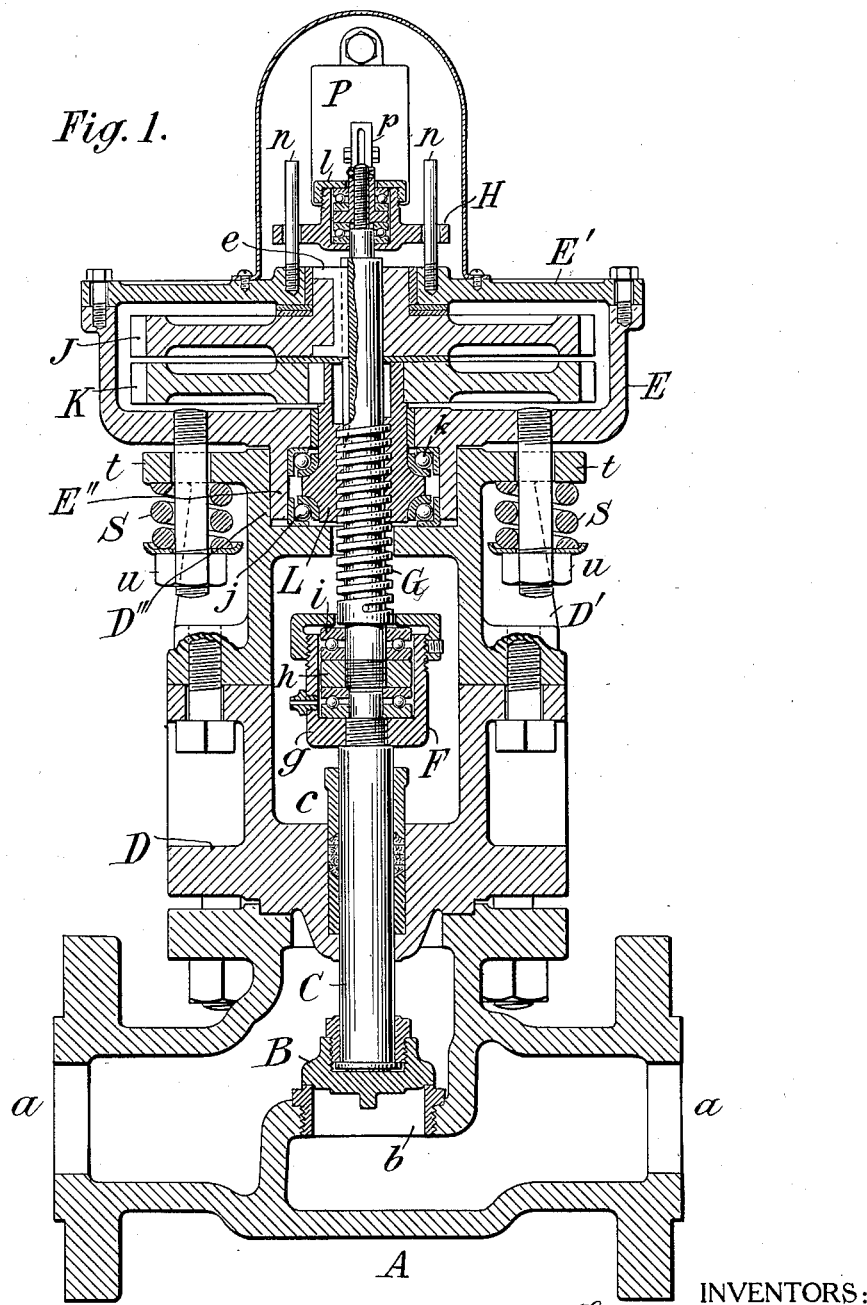
Figure 1 is a vertical mid-section of the valve as a whole.

The valve shown is of the tappet valve type, although the invention is not necessarily limited to any particular type of valve. The valve has any conventional shell or casing A, with inlet and outlet ports $a$ $a$ and an intervening seat $b$ against which closes a tappet or valve disk B mounted on a stem C which may slide up or down. Above the valve shell A is a frame D conveniently made in two parts, the upper part being lettered D'. The lower part D serves as a cap for the valve shell A. The parts D D' constitute a fixed frame. Above the upper part D' of the frame is a casing E closed at the top by a cap E'. The parts E E' constitute a movable or floating frame, as will be described later. The valve stem C is shown as passing out from the valve chamber through a stuffing box $c$, and is fitted at its top with a swivel connection F by which it is united to the lower end of a screw spindle G which passes up into and through the casing E and is swiveled at the top of this casing to a sliding crosshead H.

The motor M is shown as mounted beneath the casing E, and its shaft $m$ projects up into or through the casing E and carries a pinion $d$ which meshes with the teeth of two differential gears J and K which are enclosed within the chamber formed by the casing E. The gear J is provided with a feather $e$ engaging a key-way in the screw spindle G, so that the screw spindle is splined to the gear J so that it may rise or fall therein. The gear K is keyed to a nut L, the internal threads of which engage the screwthreads of the screw spindle G. The gears J and K have different numbers of teeth, so that while both are driven at suitably high speed by the motor pinion, their relative rotation is slow. For example, the gear J may have 65 teeth, and the gear K, 62 teeth; if the pinion $d$ has nine teeth and the motor turns at 1800 R. P. M., the difference between the revolutions of gears J and K will be 12 revolutions per minute; and if the pitch of the screw G is four threads per inch and the travel of the valve disk B is one inch, it will be fully opened or closed in twenty seconds. These proportions are given merely by way of example.

The swivel connection F is introduced between the rapidly-rotating screw G and the valve stem C in order that the latter need not rotate, or may rotate at a much slower speed than the screw. With the proportions given above the screw would turn at 249.5 R. P. M., a speed which it would be impracticable to transmit to the valve stem. The swivel is made frictionless by the interposition of ball bearings between its members $g$, $h$, $i$, which are connected respectively to the stem C and screw G. The swivel is readily accessible within the opening of the frame D D'.

The nut L, which also turns at high speed (with the proportions given, at a speed of 261.5 R. P. M.) is also mounted in ball bearings $j$, $k$, which are housed within a lower projecting portion E'' of the casing E which fits within a chamber D'' in the upper portion of the frame D'.

An electric control switch P is operated by the rising and falling movements of the screw spindle G, which are transmitted to it through the crosshead H. This crosshead is mounted on the top of the screw by means of a swivel connection *l* having ball bearings, whereby it is adapted to the high speed of rotation of the screw stem. The crosshead H slides on fixed guiding pins *n n*, and is connected by a link *o* to the operating lever *p* of the switch P. The switch is of any suitable type, being preferably a snap switch of well-known construction which stores up energy during its movement and throws over to the open or closed position at the end of the movement. Such switches are so well known that no special illustration is necessary. The electrical connections may be made as shown in Fig. 3, where P' is the switch and M is the motor, *r, r'*, being circuit leads from any source of current; *q* is a hand control switch located at any suitable distance, and from which the valve is to be operated to open or close it by throwing the switch. Between switch *q* and motor M the circuit connection *r* is divided into two leads 11 and 12 which may connect with different windings of the motor, so that when the current passes in through 11, the motor will be driven in one direction (as to open the switch), and when passed through 12, the motor will be driven in the contrary direction (as to close the switch). The function of the switch P' is solely to break the circuit and stop the motor when the valve has fully opened or closed. This switch accordingly may consist essentially of a bridge connection *s* which in one position may connect terminals 13 and 14 of lead 11, and in its other position may connect terminals 15 and 16 of lead 12. In its snap action the bridge *s* simply flies across from one pair of terminals to the other.

To stop the motor when opening the valve requires only that the circuit be broken before the valve has quite reached the end of its stroke; but during the closing stroke of the valve it is important that it shall move to the fully closed position, and it is preferable that it shall move slightly farther under such conditions as to press the valve to its seat with a suitable yielding pressure. To accomplish this, spring cushioning means are applied, which, when the valve seats itself, take up any further movement of the valve-operating parts and consequently afford a means for pressing the valve to its seat with a pressure corresponding to the stress imparted to the springs. Such springs may be variously applied; in the construction shown springs S S are interposed between ears *t* projecting from the frame D', and nuts or bolt heads *u u* connected through bolts or screw rods to the casing E. It results that during the closing movement of the valve, when the valve is stopped by striking its seat, the continued movement of the motor before the switch P breaks the circuit imparts a bodily lift through the nut L to the casing E, and through the bolts and heads *u* compresses the springs. To provide for this movement the casing E has a sliding connection with the frame D', so that the casing E may lift as a movable or floating frame. This is shown as provided by the annular flange E'' being movable in the fixed cup D''. The springs S may be proportioned and adjusted to exert any desired pressure for forcing the valve against its seat at the end of the movement. The duration of the movement may be adjusted in various ways, as, for example, by making the link *o* (Fig. 2) extensible by means of a screw stem *o'*.

The described construction affords an electrically-operated valve which may be controlled from any suitable distance, and which may be adjusted to give closure at any desired pressure. The construction is simple and effective, and the differential gearing affords a simple and advantageous means for reducing the high speed of the motor to the desired slow speed for the valve operation.

What we claim is:

1. A valve and motor with connecting means comprising a pinion driven by the motor and differential gears meshing with said pinion, said gears having different numbers of teeth whereby they are rotated at different speeds, a screw turned by one of said gears, a nut engaging the screw and turned by the other gear, and means for transmitting the relative movement of the screw and nut to the valve.

2. A valve and motor with connecting means comprising a pinion driven by the motor and differential gears meshing with said pinion, said gears having different numbers of teeth whereby they are rotated at different speeds, a screw turned by one of said gears, a nut engaging the screw and turned by the other gear, and a connection between the screw and valve whereby the longitudinal movement of the screw is transmitted to the valve.

3. A valve and motor with connecting means comprising a pinion driven by the motor and differential gears meshing with said pinion, said gears having different numbers of teeth whereby they are rotated at different speeds, a screw turned by one of said gears, a nut engaging the screw and turned by the other gear, and a swivel connection between the screw and valve adapted to transmit to the valve the longitudinal movement of the screw.

4. The device of claim 3 with a switch in the motor circuit, and a swivel connection to operate said switch from the rotating screw.

5. A valve and motor according to claim 2, with bearing means receiving the reaction of said nut when the valve is seated, movable relatively to the valve shell, and an interposed yielding means adapted to resist such movement so as to be stressed when the valve is closed.

6. A valve and motor with interposed reducing gearing, a frame having fixed connection with the valve casing, a floating frame movable relatively to the fixed frame, the valve stem having threads, a nut engaged thereby reacting against the floating frame, and a spring stressing the floating frame, whereby upon the seating of the valve the floating frame is displaced against the stress of the spring.

7. A valve according to claim 6, the gearing carried by said floating frame.

8. A valve according to claim 6, the gearing and the motor carried by said floating frame.

9. A valve according to claim 6, and a switch for stopping the motor, operated by the movements of the floating frame.

10. A valve having a fixed frame and a movable frame, the latter guided to move relatively to the former, a motor and reducing gearing for operating the valve, said gearing carried in the movable frame, and a spring adapted to be stressed as the valve is closed, forming a resilient connection between the frames.

11. A valve having a fixed frame and a movable frame, the latter guided to move relatively to the former, and having a chamber, a motor and reducing gearing, said gearing enclosed in said chamber, a valve stem operated by said gearing, and a spring connection between said frames arranged to yieldingly react to the closing movement of the movable frame, whereby it is stressed after the valve is closed.

In witness whereof, we have hereunto signed our names.

THEODORE M. BRUBACK.
DE LOS E. HIBNER, Jr.